(12) United States Patent
Zilzer

(10) Patent No.: US 11,214,443 B1
(45) Date of Patent: Jan. 4, 2022

(54) DYNAMICALLY SHAPED CONVEYOR GUIDE APPARATUS AND RELATED METHODS

(71) Applicant: Carlos P. Zilzer, Pembroke Pines, FL (US)

(72) Inventor: Carlos P. Zilzer, Pembroke Pines, FL (US)

(*) Notice: Subject to any disclaimer, the term of this patent is extended or adjusted under 35 U.S.C. 154(b) by 0 days.

(21) Appl. No.: 17/238,621

(22) Filed: Apr. 23, 2021

Related U.S. Application Data

(60) Provisional application No. 63/132,195, filed on Dec. 30, 2020.

(51) Int. Cl.
  *B65G 21/20* (2006.01)
  *B65G 47/22* (2006.01)
  *B65G 43/00* (2006.01)
  *B65G 47/84* (2006.01)

(52) U.S. Cl.
  CPC ......... *B65G 21/2054* (2013.01); *B65G 43/00* (2013.01); *B65G 47/22* (2013.01); *B65G 47/84* (2013.01); *B65G 2203/0283* (2013.01)

(58) Field of Classification Search
  CPC ............... B65G 21/2054; B65G 21/20; B65G 21/2072; B65G 47/22
  USPC ............................ 198/836.3, 473.1, 626.6
  See application file for complete search history.

(56) References Cited

U.S. PATENT DOCUMENTS

| | | | | |
|---|---|---|---|---|
| 1,355,184 A * | 10/1920 | Taliaferro | ............ | B65G 47/841 198/456 |
| 2,781,123 A * | 2/1957 | Gueffroy | ................. | B65B 43/52 198/459.1 |
| 3,185,187 A * | 5/1965 | Luther | .................. | B65B 39/145 141/7 |
| 4,176,511 A * | 12/1979 | Scudder | ................. | A01D 46/28 56/330 |
| 5,090,557 A * | 2/1992 | Carmen | ................. | B65G 15/14 198/626.1 |
| 5,322,160 A * | 6/1994 | Markiewicz | ....... | B65G 21/2072 198/836.1 |
| 5,551,555 A * | 9/1996 | Gladieux | ........... | B65G 21/2072 198/633 |
| 7,530,453 B2 * | 5/2009 | Ingraham | ........... | B65G 21/2072 198/817 |
| 2012/0168284 A1 * | 7/2012 | Pawelski | ............. | F15B 15/1404 198/836.3 |
| 2016/0176651 A1 * | 6/2016 | Landler | ................ | B65D 1/0223 198/395 |

FOREIGN PATENT DOCUMENTS

| | | | |
|---|---|---|---|
| EP | 1084905 A1 | 3/2001 | |
| EP | 2495190 A1 | 9/2012 | |
| EP | 3566980 A2 | 11/2019 | |

* cited by examiner

*Primary Examiner* — James R Bidwell
(74) *Attorney, Agent, or Firm* — Dickinson Wright PLLC; Andrew D. Dorisio

(57) ABSTRACT

An apparatus guides at least one article traveling along a conveyor in a conveying direction, the at least one article having a shape. A plurality of guides of the apparatus guide the at least one article, such that positive control may be maintained during conveyance. The plurality of guides are dynamically adjustable in the transverse direction. At least one actuator adjusts a position of one or more of the plurality of guides based on the shape of the at least one article. Related methods are also disclosed.

33 Claims, 20 Drawing Sheets

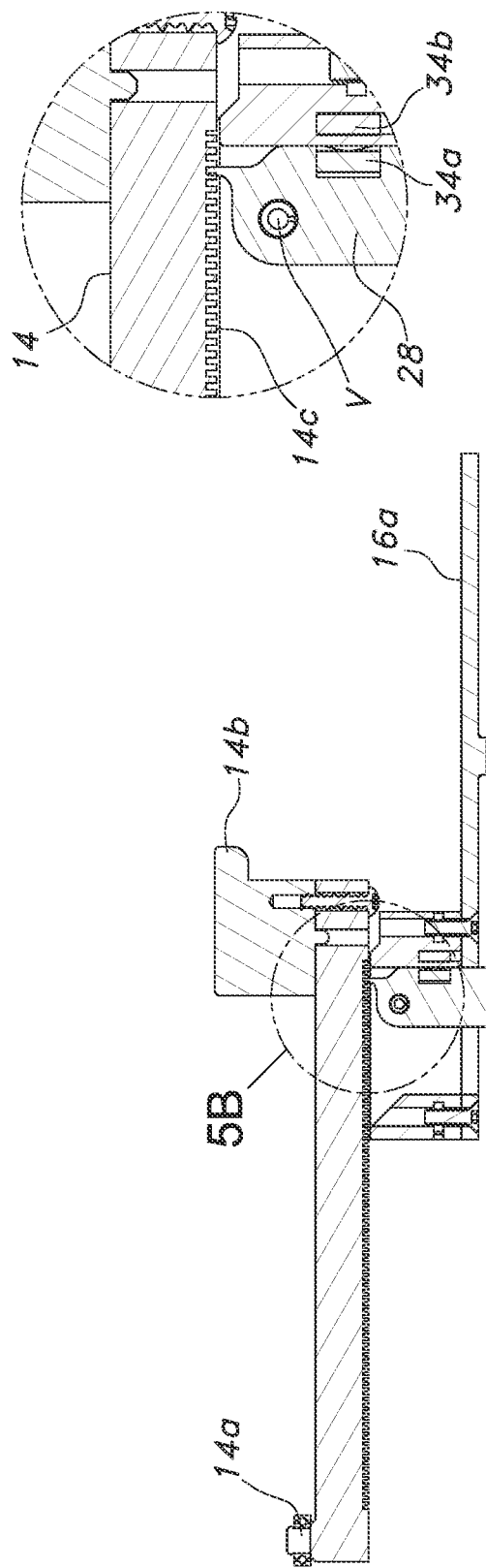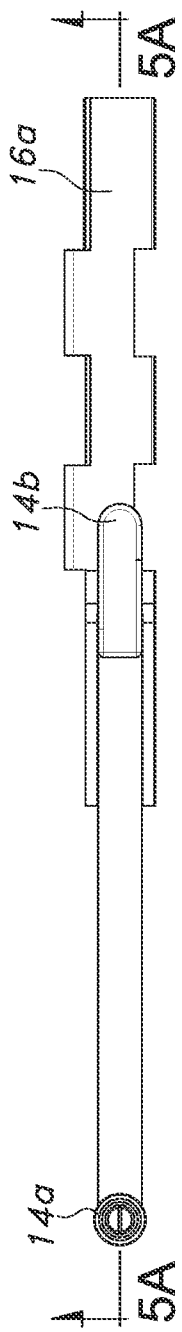

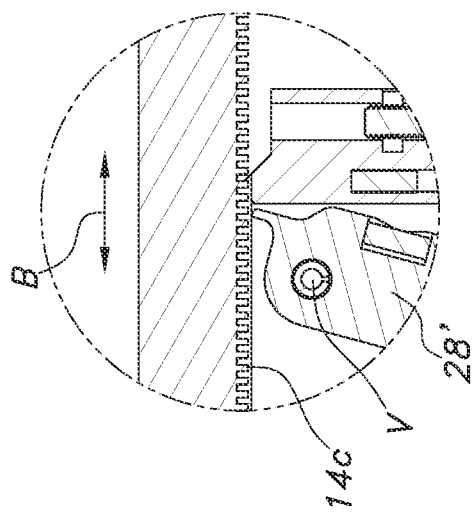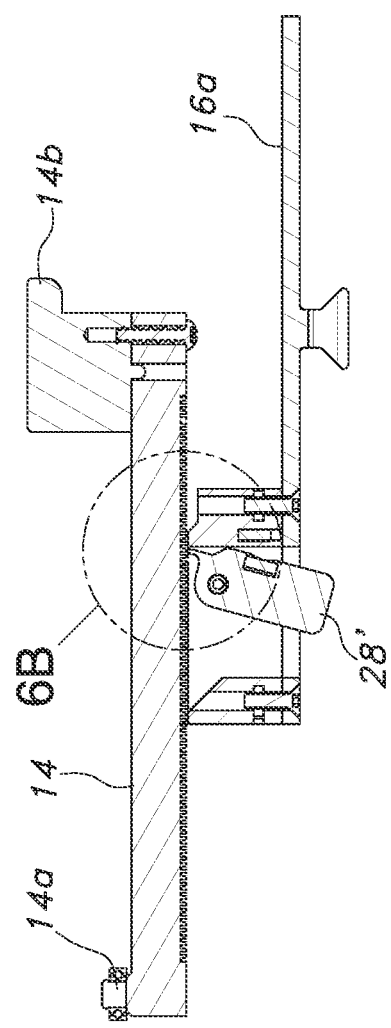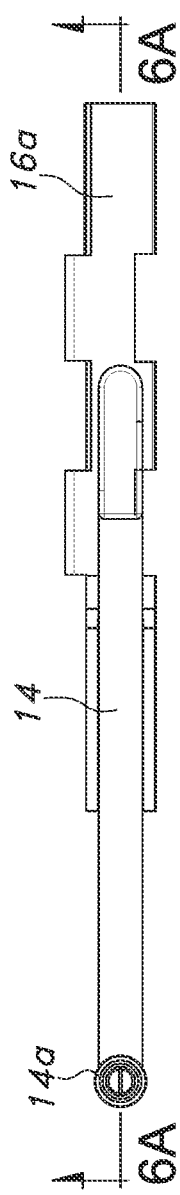

DYNAMICALLY SHAPED CONVEYOR GUIDE APPARATUS AND RELATED METHODS

This application claims the benefit of U.S. Provisional Patent Application Ser. No. 63/132,195, the disclosure of which is fully incorporated herein by reference.

TECHNICAL FIELD

This disclosure relates to the article conveying arts and, in particular, to a dynamically shaped conveyor guide apparatus and related methods.

BACKGROUND

Conveyors typically have rails positioned along each side of the conveyor chain or belt to guide an article along a conveying path. Articles travel between the rails, which are positioned to ensure that the articles remain on the conveying path. When a larger or smaller article is conveyed, or the width of the conveying path otherwise needs to be adjusted to accommodate an increased or reduced article flow, the guiderails must be adjusted to fit the situation.

Conventional conveyor arrangements typically employ elongated static guiderails that may adjust toward and away from the conveying path as necessary, depending on the width of the articles conveyed. Such a static guiderail does not exert positive control (that is, keeping and controlling or modifying the article's separation, relative position, orientation, and stability along the conveying path, thereby maintaining the article's integrity (i.e., no physical damage)) on the article during conveyance. Significant adjustment is also periodically required to achieve changeover when the size or shape of the article being conveyed changes. This may involve deleterious downtime and significant effort to achieve, which translates to a loss of productivity, increased costs, and an overall loss of profitability.

Accordingly, a need is identified for a dynamically shaped guide rail that overcomes the foregoing limitations and possibly others that have yet to be realized.

SUMMARY

According to one aspect of the disclosure, an apparatus is provided for guiding at least one article traveling along a conveyor in a conveying direction, the at least one article having a shape in a transverse direction relative to the conveying direction. The apparatus includes a plurality of guides for guiding the at least one article, the plurality of guides each being dynamically adjustable in the transverse direction. At least one actuator is provided for adjusting a relative position the plurality of guides in the transverse direction based on the shape of the at least one article. The apparatus may further include a conveyor for conveying the plurality of guides relative to (and in sequence with articles conveyed by) the article conveyor.

In one embodiment, the at least one actuator is adapted to move in the transverse direction. The actuator may comprise a cam surface and each of the plurality of guides includes a cam follower for engaging the camming surface. The cam follower may comprise a roller.

Each of the plurality of guides comprises a tip for engaging the at least one article. Each of the plurality guides may further include a lock adapted for locking the guide at a deployed position relative to the at least one article, and unlocking for allowing the guide to move to a retracted position relative to the at least one article. A second actuator may be provided for returning each of the plurality of guides to a retracted position.

The apparatus may further include a controller for controlling movement of the at least one actuator based on a pre-programmed profile corresponding to the shape of the at least one article. The at least one article is a plurality of articles, and further including a controller for controlling movement of the at least one actuator based on a pre-programmed profile corresponding to a shape of each of the plurality of articles.

In one embodiment, the plurality of guides comprise first guides along one side of the at least one article, the at least one actuator comprises a first actuator, and further including a plurality of second guides opposing the plurality of first guides, each being dynamically adjustable in a direction transverse to the conveying direction. At least one second actuator may be provided for adjusting a position of the plurality of second guides in the transverse direction based on the shape of the at least one article.

In one embodiment, the plurality of guides comprise first guides having a first elevation relative to the conveyor, and further including a plurality of second guides being dynamically adjustable in the transverse direction, the plurality of second guides having a second elevation relative to the conveyor. The first or second elevation may be adjustable.

According to another aspect of the disclosure, an apparatus for guiding at least one article having a shape is provided. The apparatus includes a conveyor for conveying the article in a conveying direction. A plurality of guides are provided for guiding the at least one article, the plurality of guides each being dynamically adjustable in a direction transverse to the conveying direction. At least one actuator is provided for adjusting a position of the plurality of guides based on the shape of the at least one article.

In one embodiment, the at least one actuator is adapted to move in the transverse direction. The at least one actuator may comprise a cam surface and each of the plurality of guides comprises a cam follower for engaging the camming surface. The cam follower may comprise a roller.

In one embodiment, each of the plurality of guides comprises a tip for engaging the at least one article. Each of the plurality guides includes a lock adapted for locking the guide at a deployed position relative to the at least one article, and unlocking for allowing the guide to move to a retracted position relative to the at least one article. A second actuator may be provided for returning each of the plurality of guides to the retracted position.

A controller may also be provided for controlling movement of the at least one actuator based on a pre-programmed profile corresponding to the shape of the at least one article. The at least one article may comprise a plurality of articles, in which case the apparatus may further include a controller for controlling movement of the at least one actuator based on a pre-programmed profile corresponding to a shape of each of the plurality of articles.

The plurality of guides may comprise first guides along one side of the at least one article, the at least one actuator comprises a first actuator, and further including a plurality of second guides opposing the plurality of first guides, each being dynamically adjustable in the transverse direction. At least one second actuator may be provided for adjusting a position of the plurality of second guides based on the shape of the at least one article.

The plurality of guides may comprise first guides having a first elevation relative to the conveyor, and further including a plurality of second guides being dynamically adjustable in the transverse direction, the plurality of second guides having a second elevation relative to the conveyor. The first or second elevation may be adjustable.

This disclosure also relates to a method for guiding at least one article being conveyed in a conveying direction, the at least one article having a shape. The method comprises dynamically adjusting a relative position of a plurality of guides in a direction transverse to the conveying direction based on the shape of the at least one article for guiding the at least one article being conveyed.

In one embodiment, the adjusting step comprises moving the plurality of guides in the transverse direction different amounts to create a profile corresponding to a perimetrical surface of the at least one article. The adjusting step may comprise raising or lowering the plurality of guides. The adjusting step may comprise changing the elevation of a first set of guides of the plurality of guides relative to a second set of guides.

BRIEF DESCRIPTION OF THE DRAWING FIGURES

The accompanying drawing figures incorporated herein and forming a part of the specification, illustrate several aspects of the disclosed inventions and, together with the textual description, serve to explain certain principles thereof. In the drawing figures.

Figure 7:
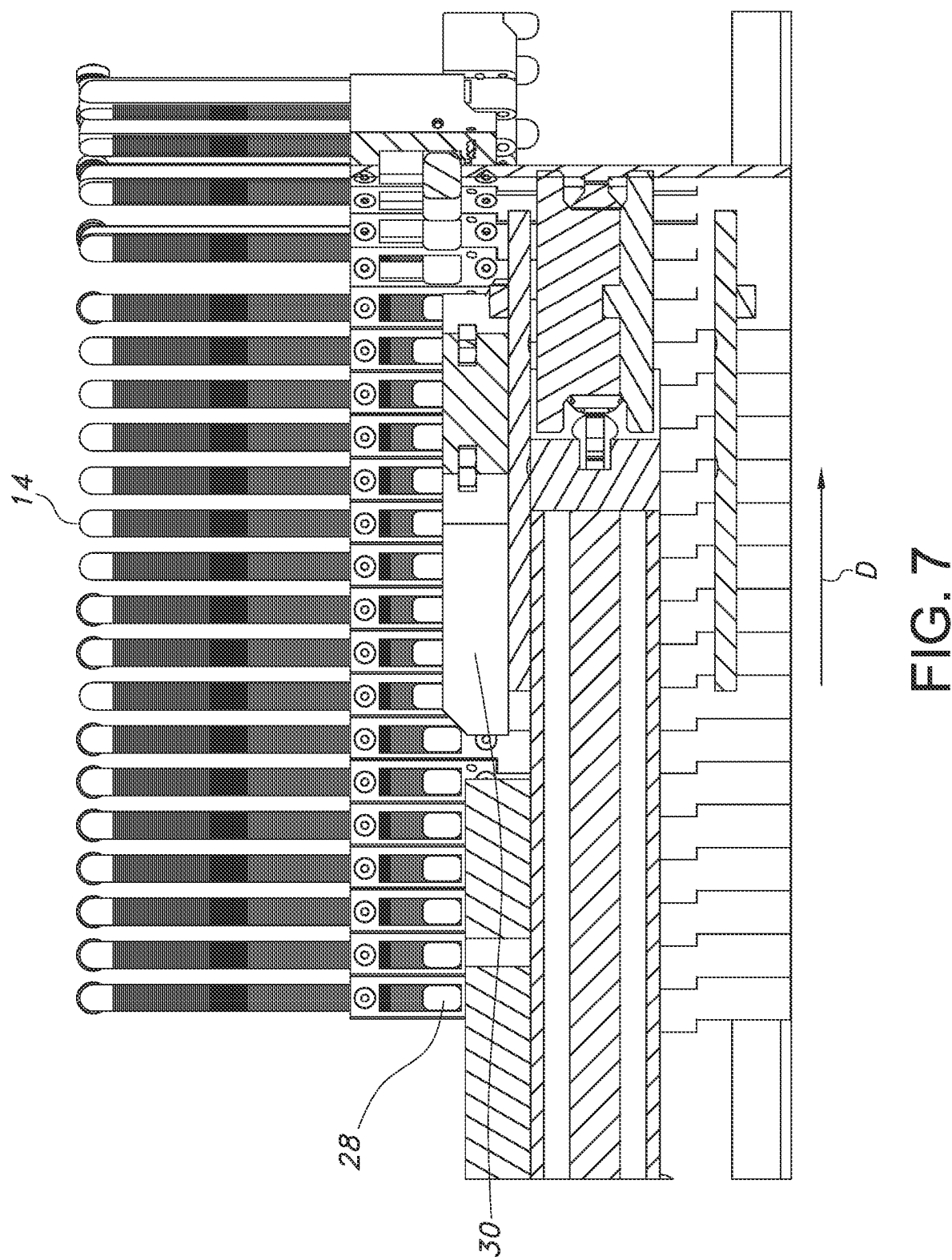
Figure 8:
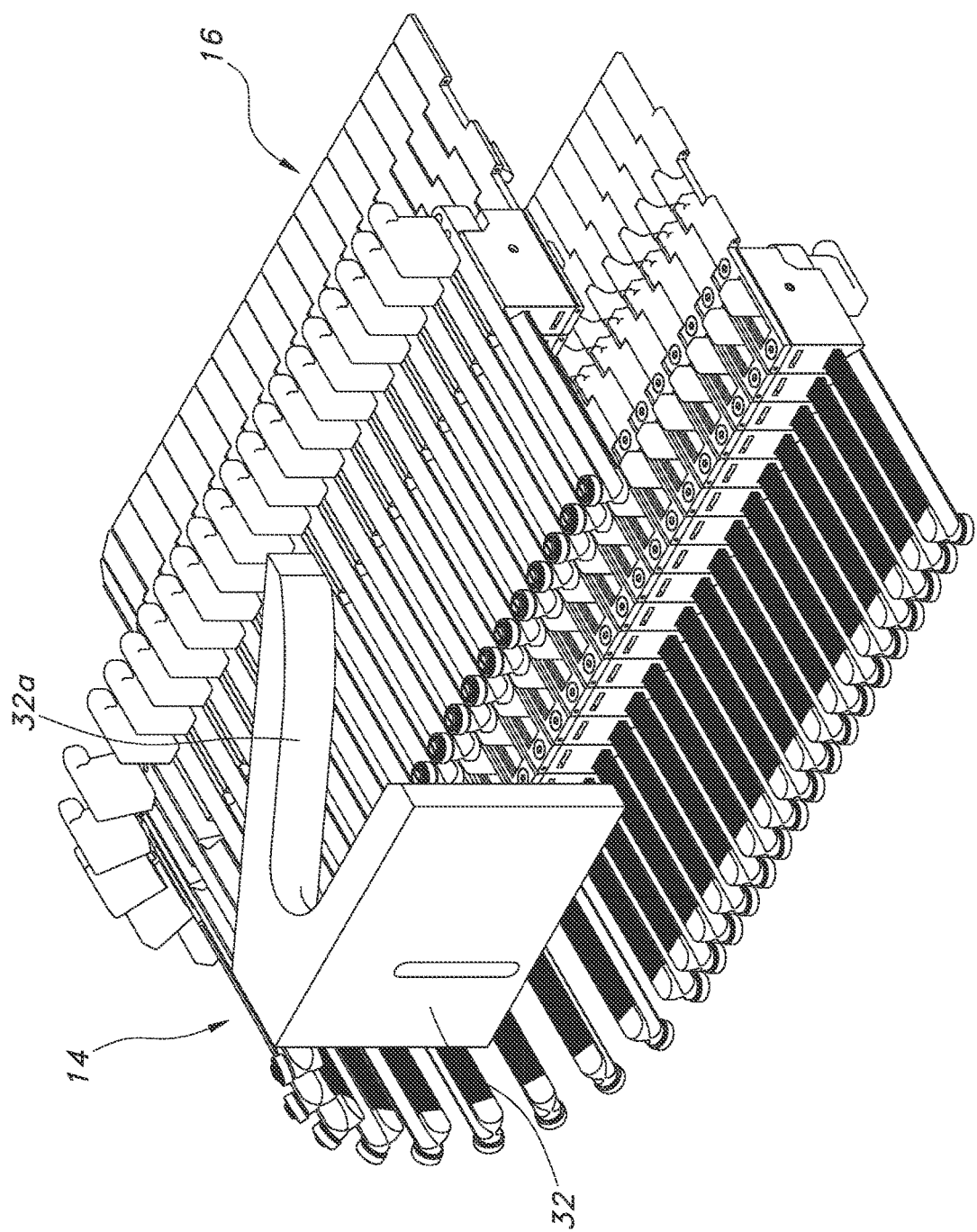
Figure 9:
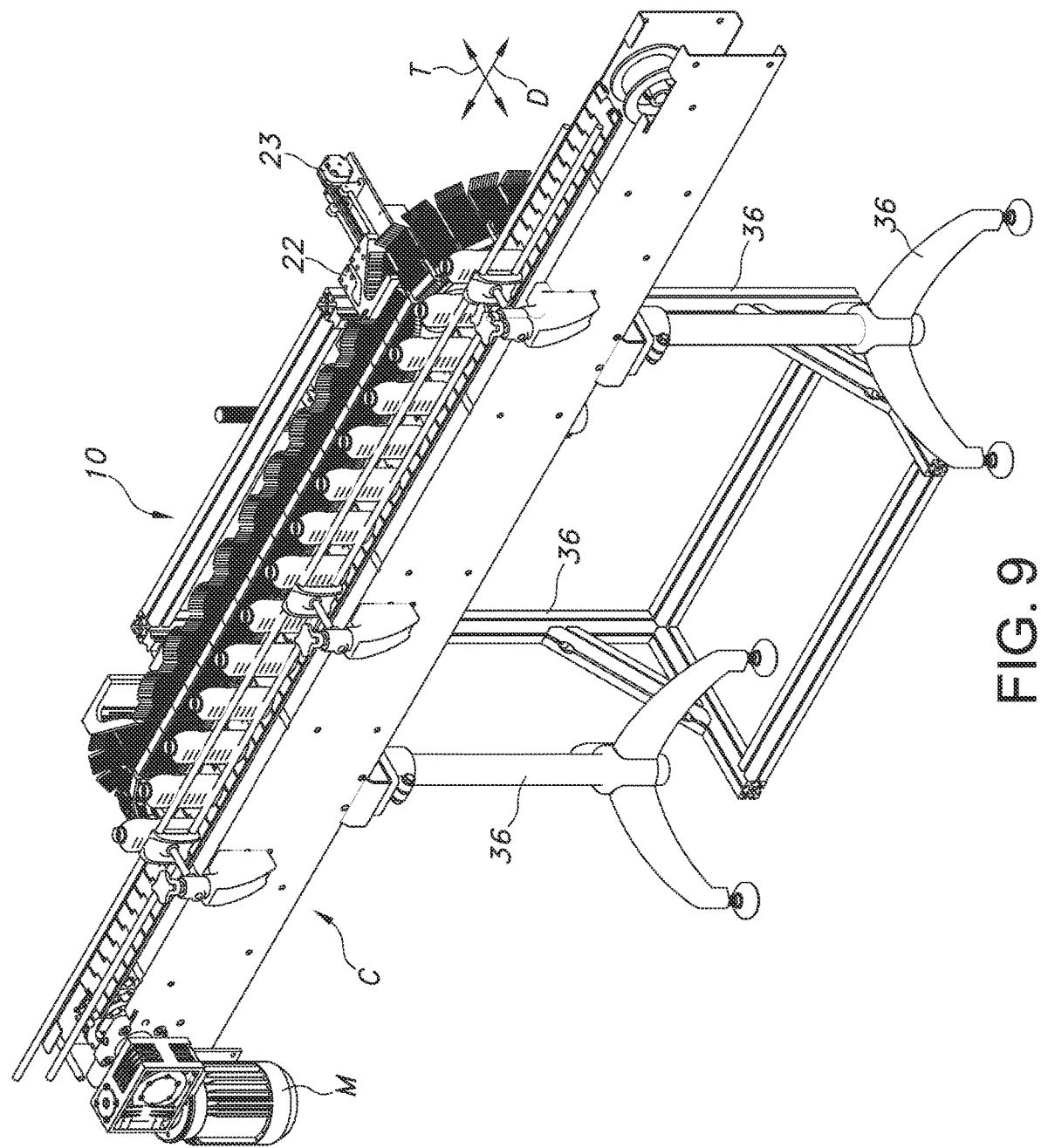
Figure 10:
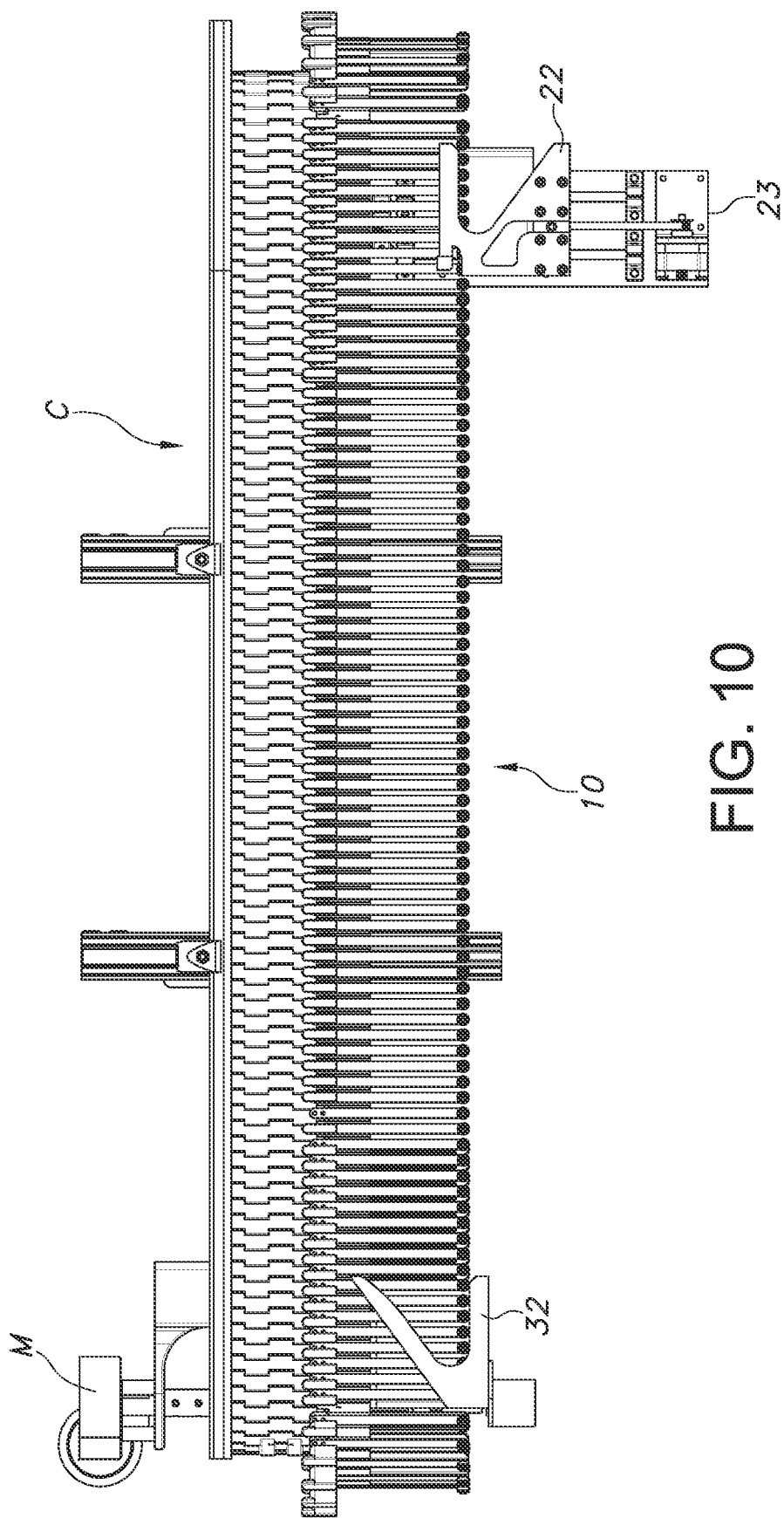
Figure 11:
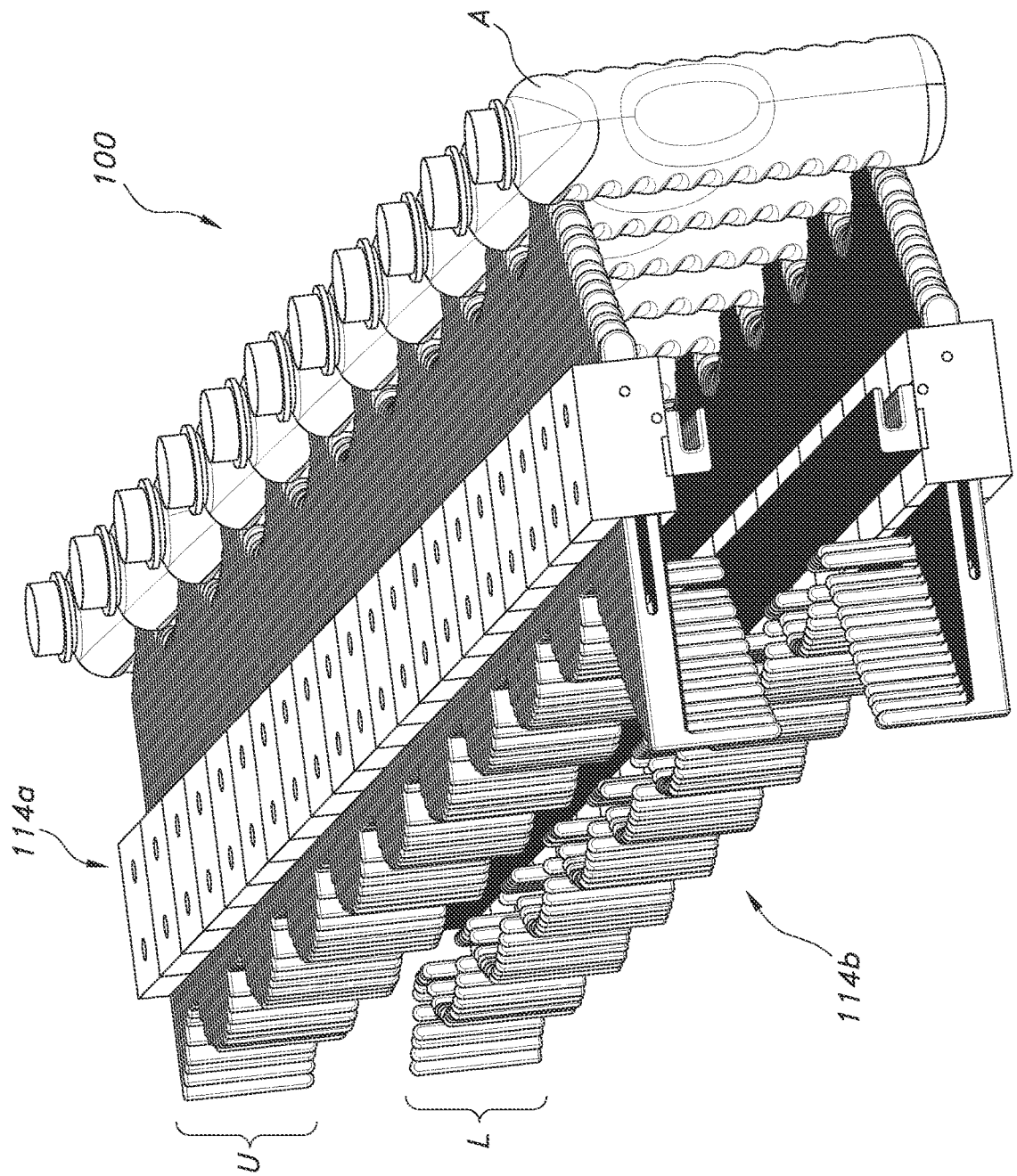
Figure 12:
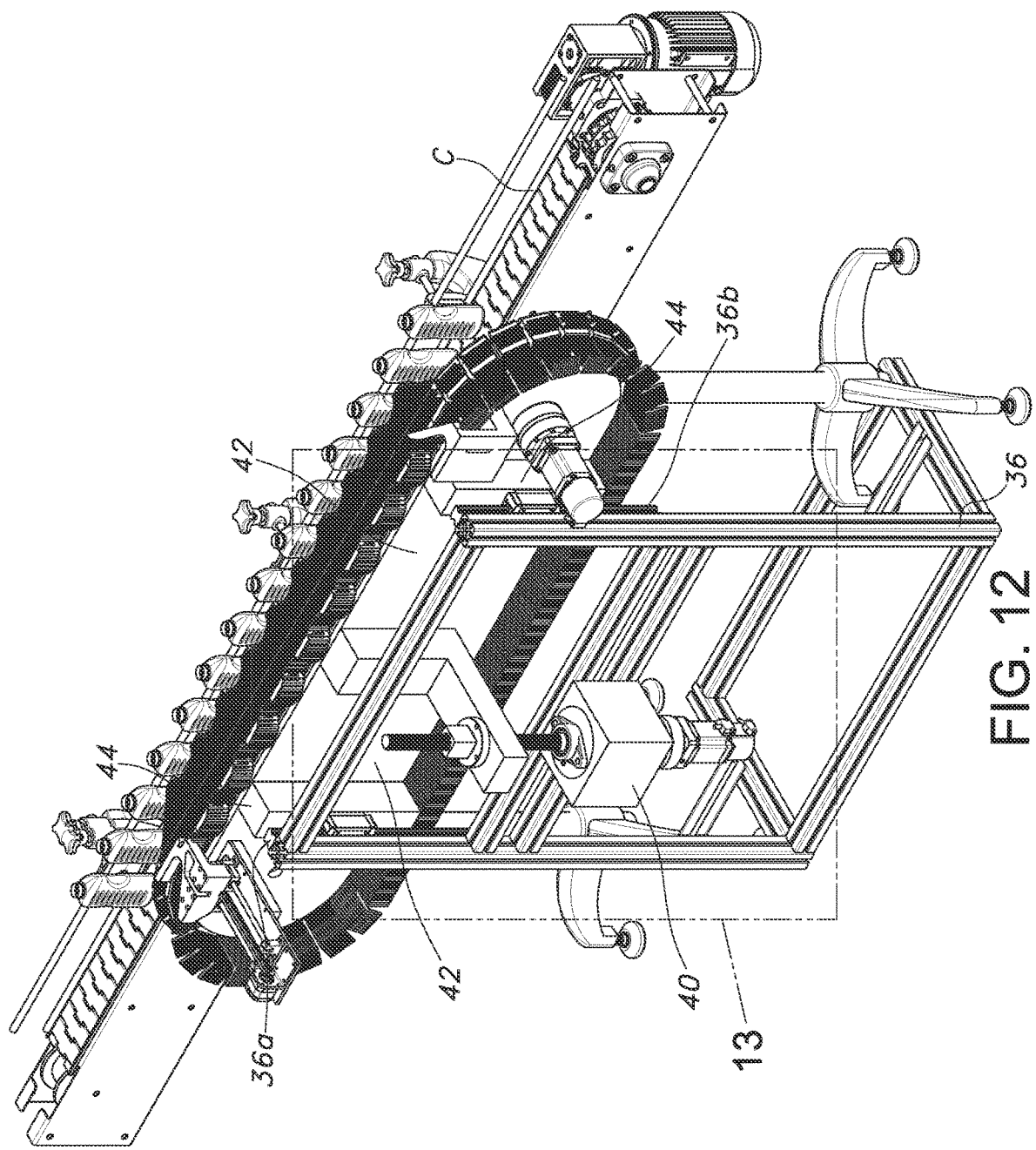
Figure 13:
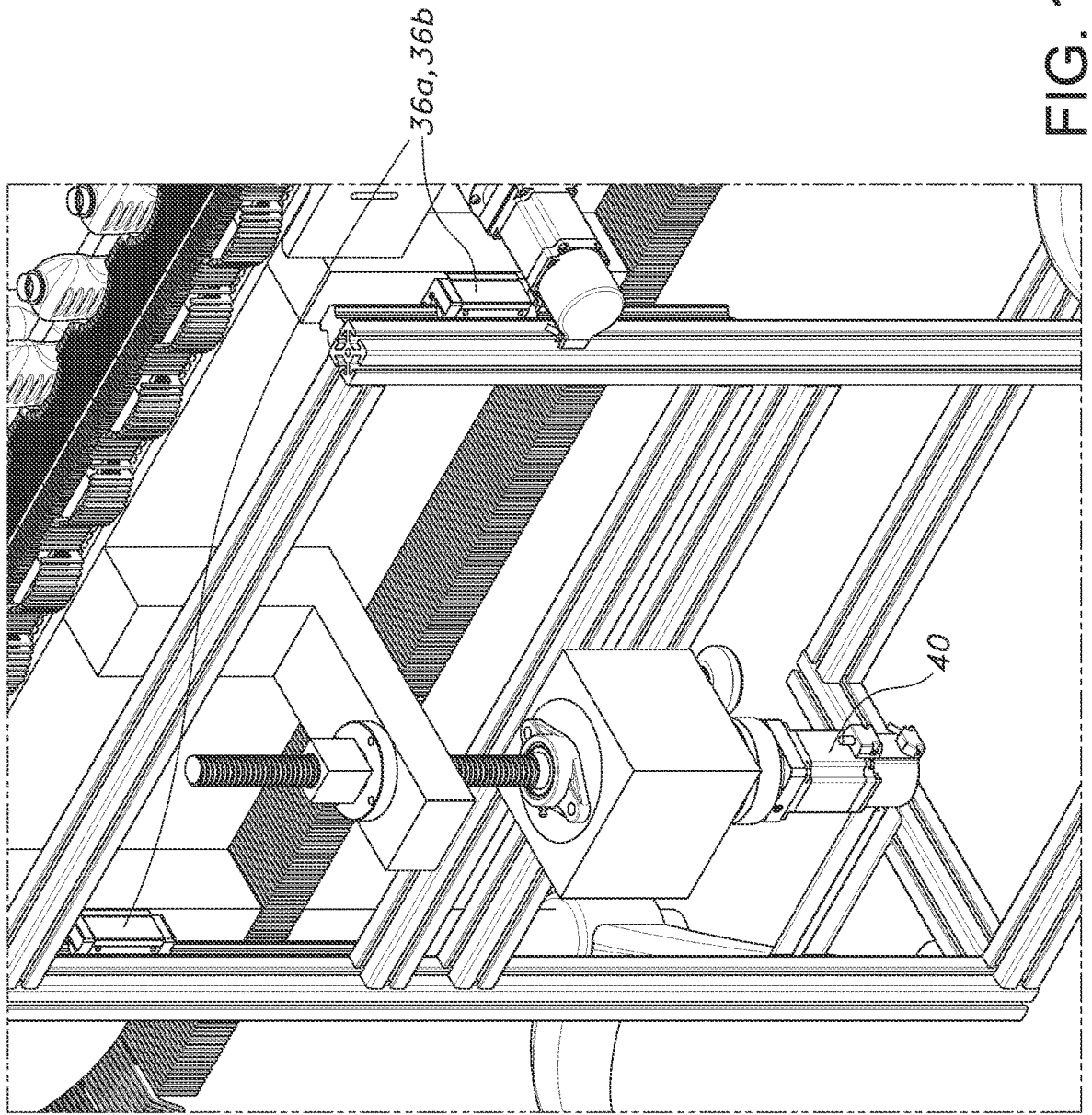
Figure 14:
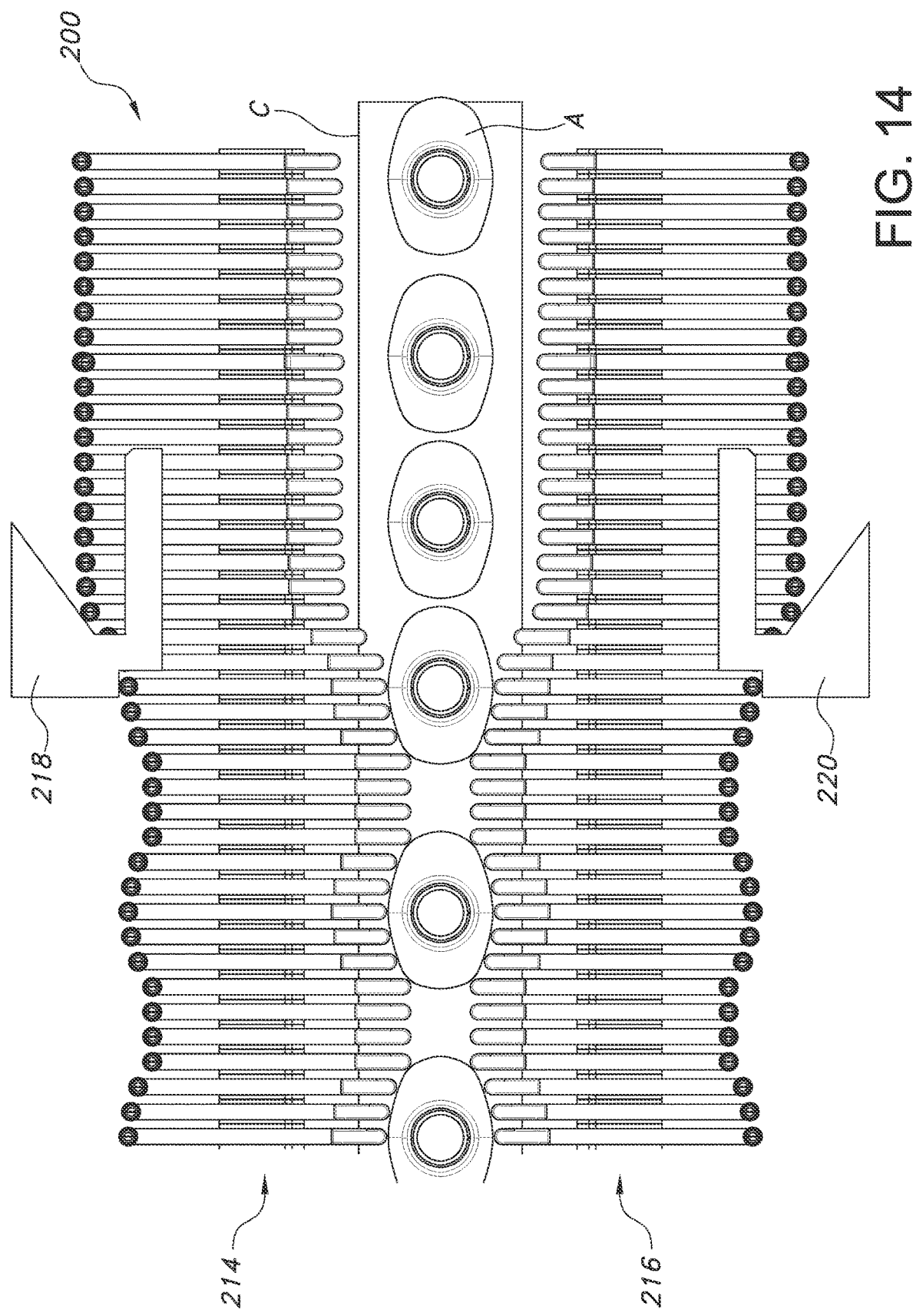
Figure 15:
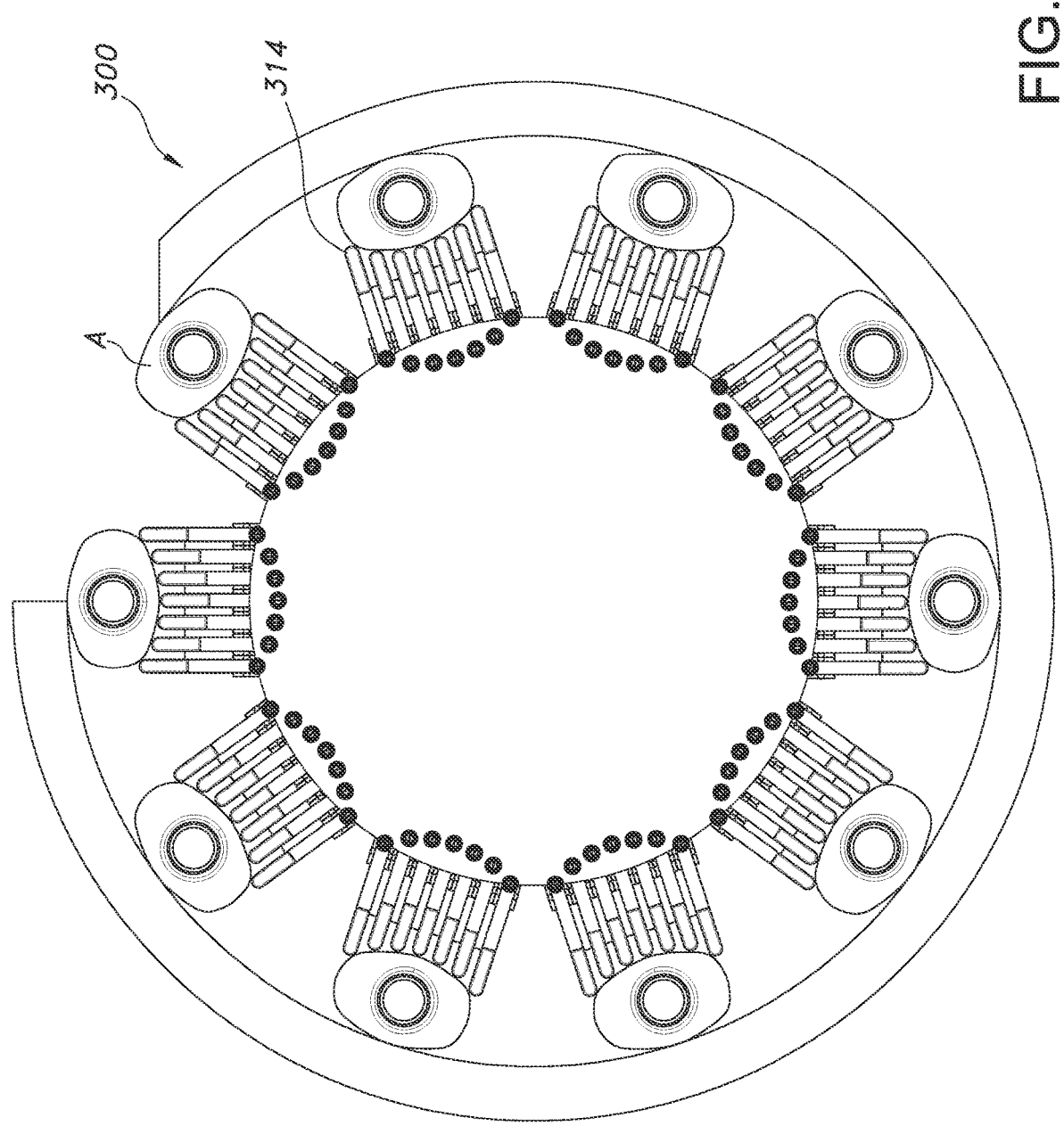

FIGS. 5, 5A, and 5B are top, cross-sectional, and enlarged views of a lock for locking and unlocking the movement of each guide, shown in a locked condition;

FIGS. 6, 6A, and 6B are top, cross-sectional, and enlarged views of a lock for locking and unlocking the movement of each guide, shown in an unlocked condition;

FIG. 7 is a partial illustration of the apparatus showing an actuator for the lock;

FIG. 8 is a partially cutaway perspective view showing an actuator for returning the guides to a home or retracted position, such as at an end of a forward run of the associated conveyor;

FIG. 9 is a front perspective view of the guide apparatus used in connection with an article conveyor;

FIG. 10 is a plan view of the guide apparatus used in connection with an article conveyor;

FIG. 11 illustrates an alternative embodiment with dynamically shaped guides at different elevations;

FIG. 12 is a rear perspective view of a height-adjustable guide apparatus used in connection with an article conveyor;

FIG. 13 is a partially cutaway enlarged view of the apparatus of FIG. 12;

FIG. 14 is a plan view of another embodiment of a dynamically shaped guide apparatus; and FIG. 15 is a plan view of still another embodiment of a dynamically shaped guide apparatus.

Reference will now be made in detail to the present preferred embodiments of a dynamically shaped guide apparatus for guiding articles being conveyed, examples of which are illustrated in the accompanying drawing figures.

DETAILED DESCRIPTION

Figure 1:
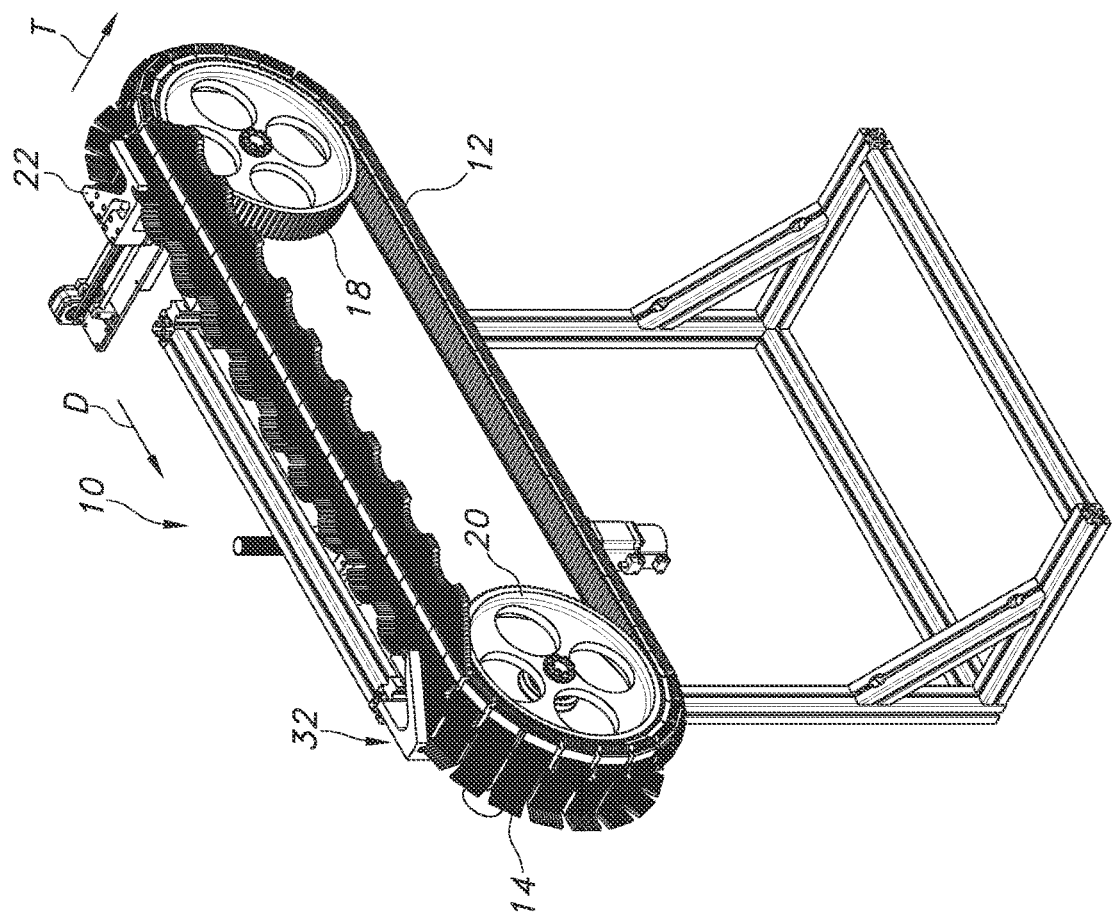
FIG. 1 is a perspective view of a dynamically shaped guide apparatus according to one aspect of the disclosure.
Figure 1A:
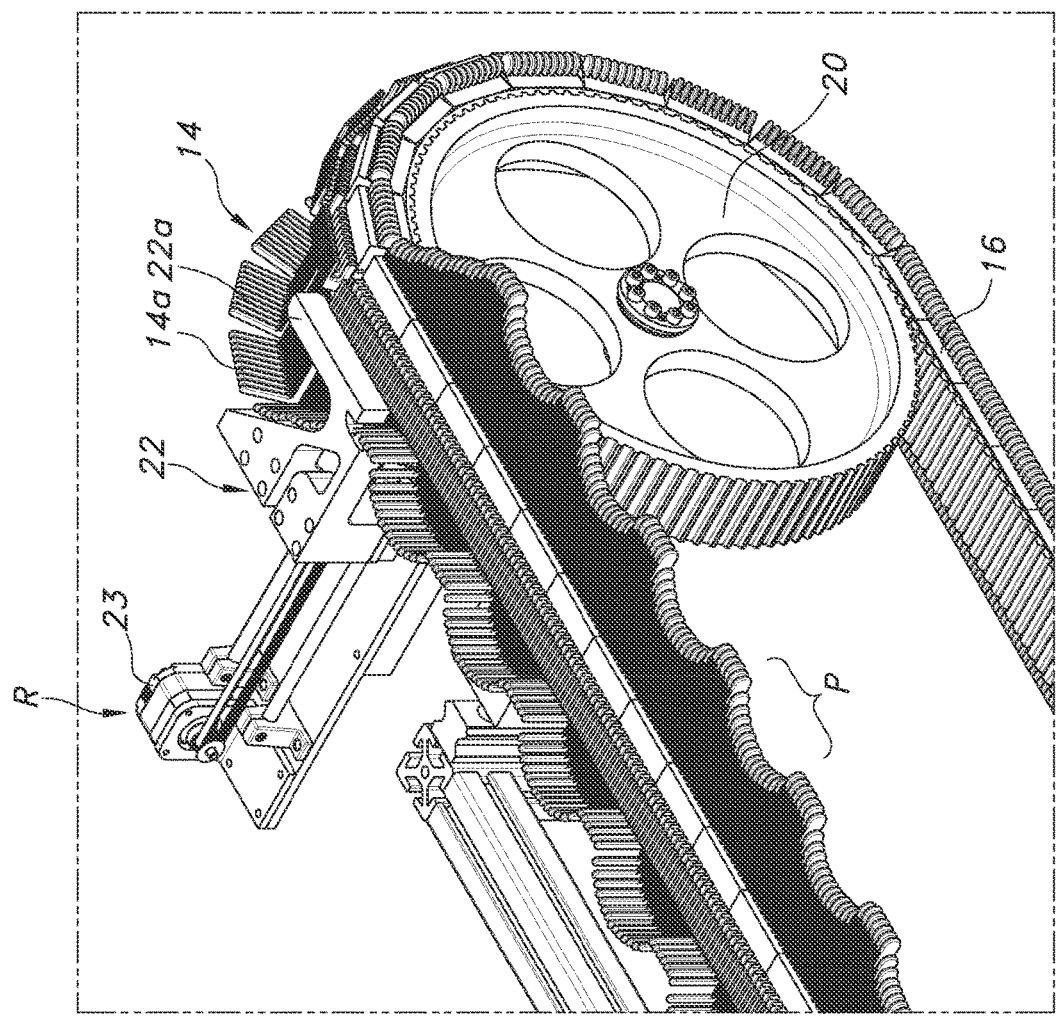
FIGS. 1A and 1B are partial enlarged views of the apparatus of FIG. 1.
Figure 1B:
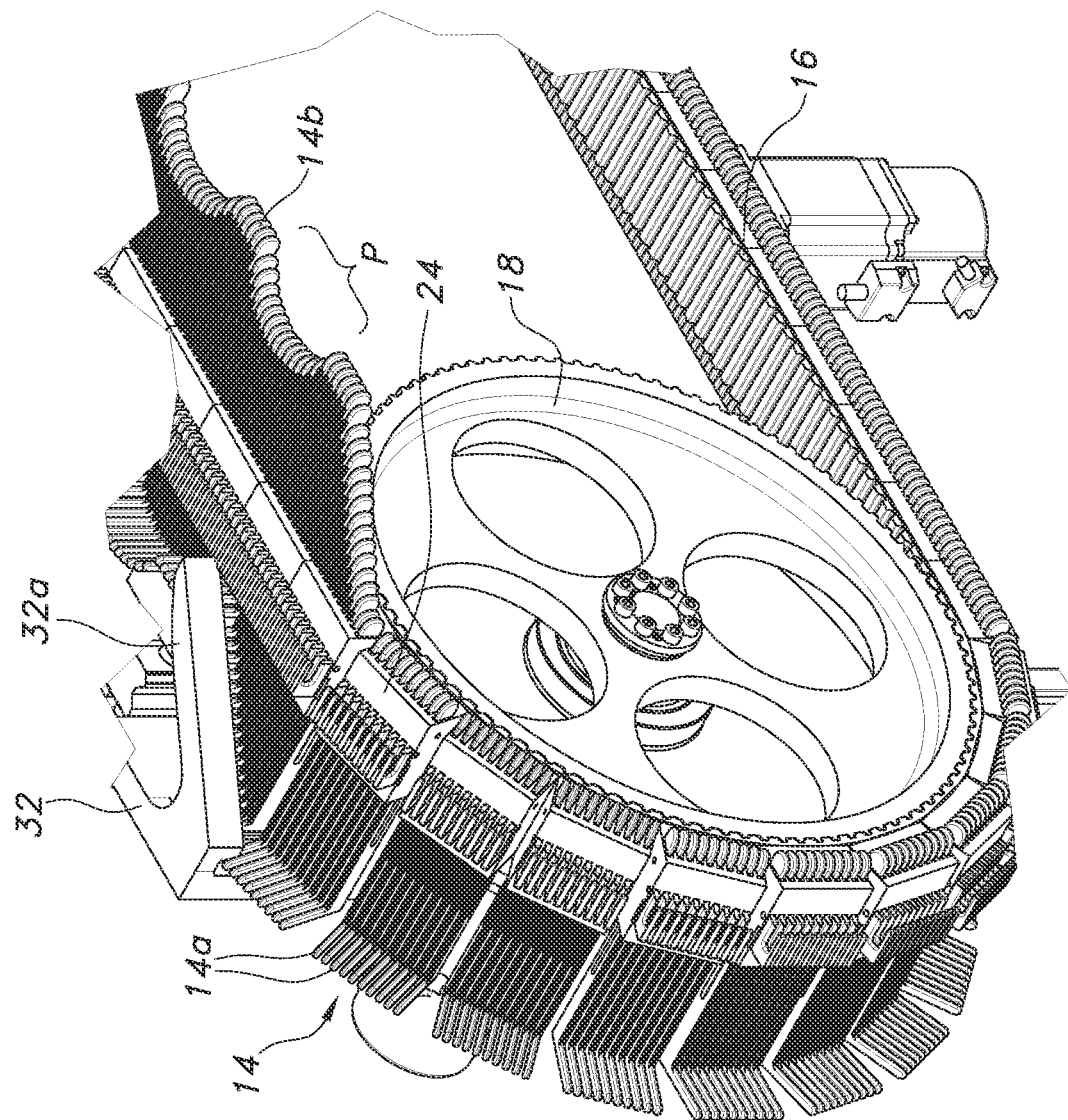

With reference to FIGS. 1, 1A, and 1B, one possible embodiment of a dynamically shaped conveyor guide apparatus 10 according to one aspect of the invention is illustrated. As can be understood, the apparatus 10 comprises an endless conveyor 12 having a conveying direction D, and includes a plurality of guides 14 adapted to move to and fro in a transverse direction T relative to the conveying direction (which transverse direction is shown as being generally orthogonal to the conveying direction, but could be a different angle as desired, for example an acute angle, and usually one greater than 45 degrees). The guides 14 may be connected to movable support, such as an endless belt or chain 16, which may be driven in an endless path over a drive wheel or sprocket 18 connected to a suitable drive motor (see motor M in FIGS. 9 and 10) and an idler wheel or sprocket 20. A suitable guiderail or like structure may also be provided for guiding the belt or chain 16, or it may be self-supported, depending on what is dictated by the dimensions and weight considerations.

Figure 2:
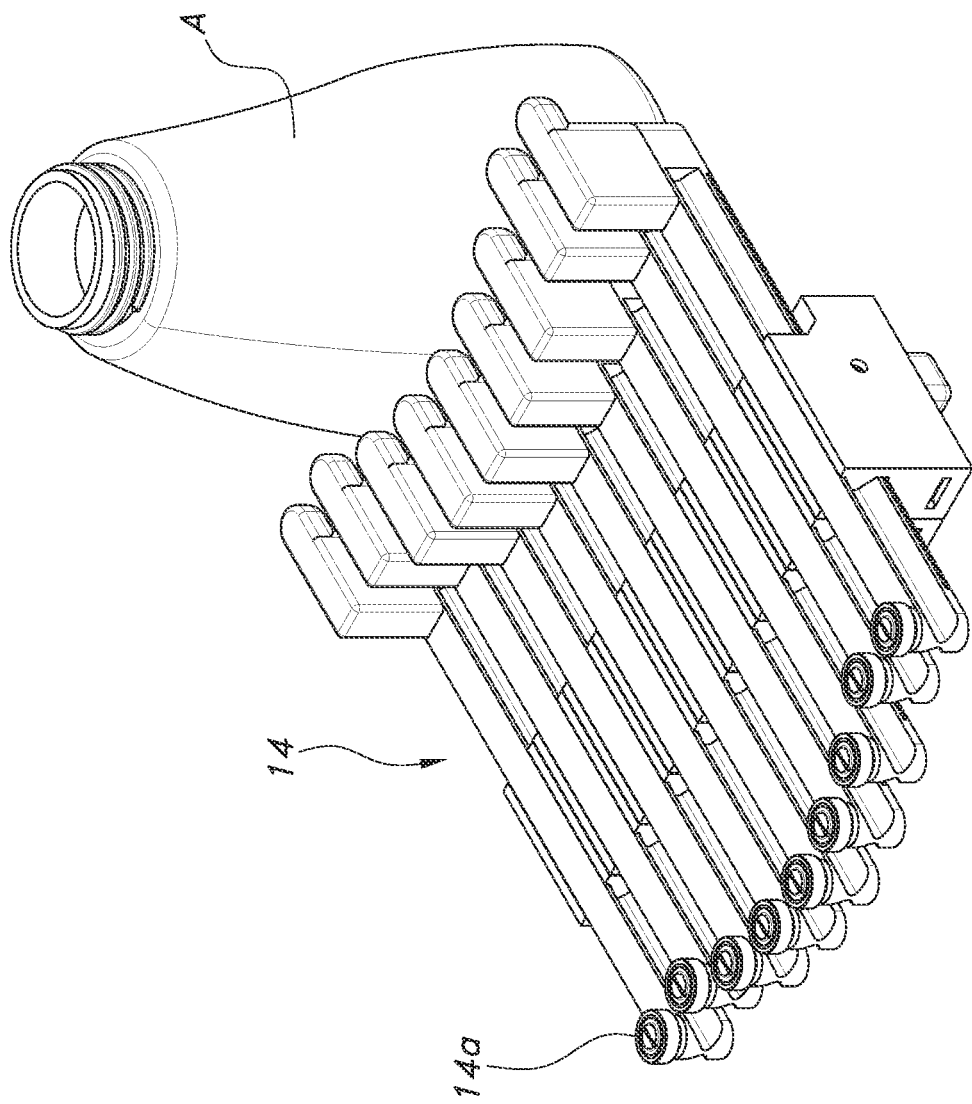
FIG. 2 is a rear perspective view showing the plurality of dynamically adjustable guides forming a contoured profile for guiding an article being conveyed.
Figure 2A:
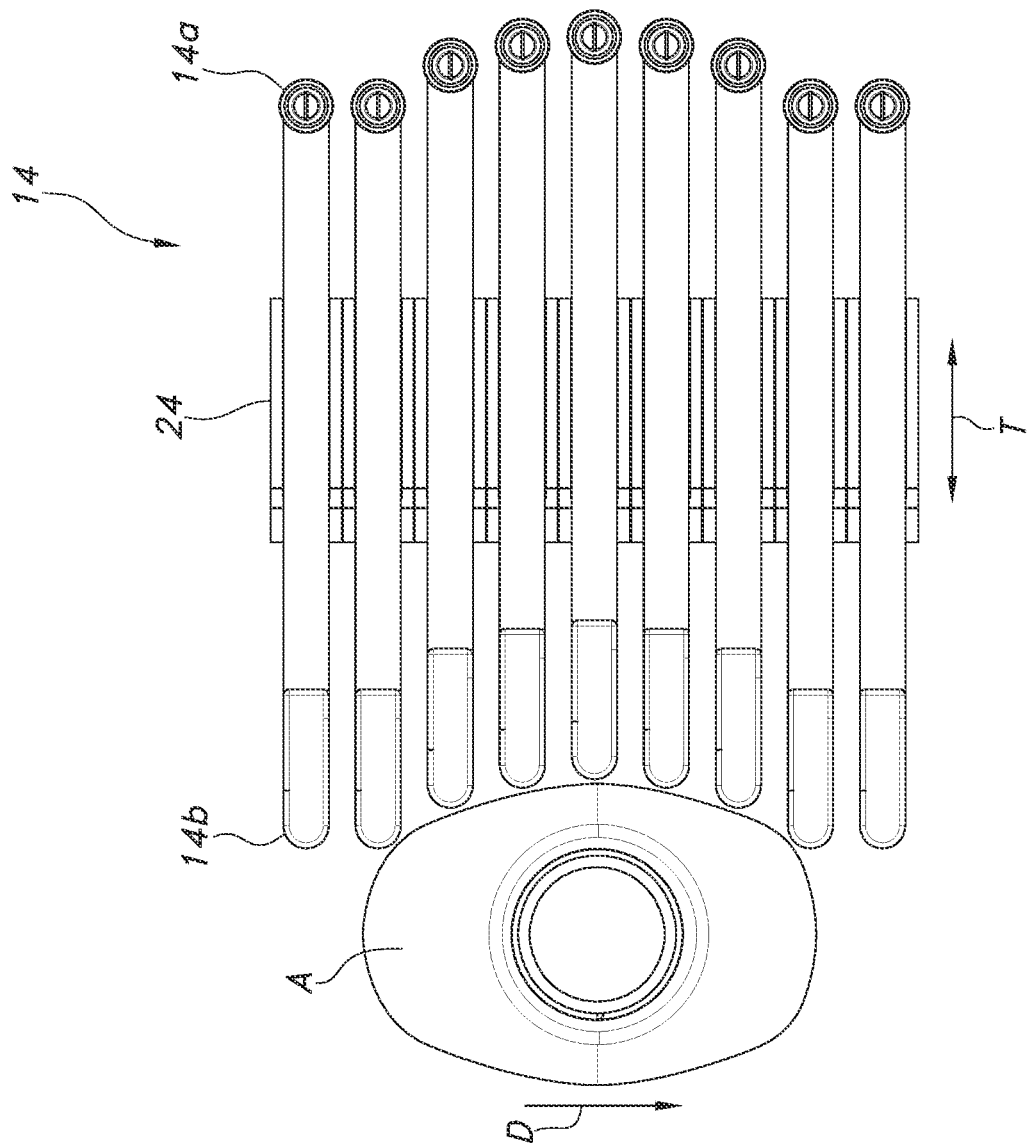
FIG. 2A is a top view showing the plurality of dynamically adjustable guides forming a contoured profile for guiding an article being conveyed.
Figure 2B:
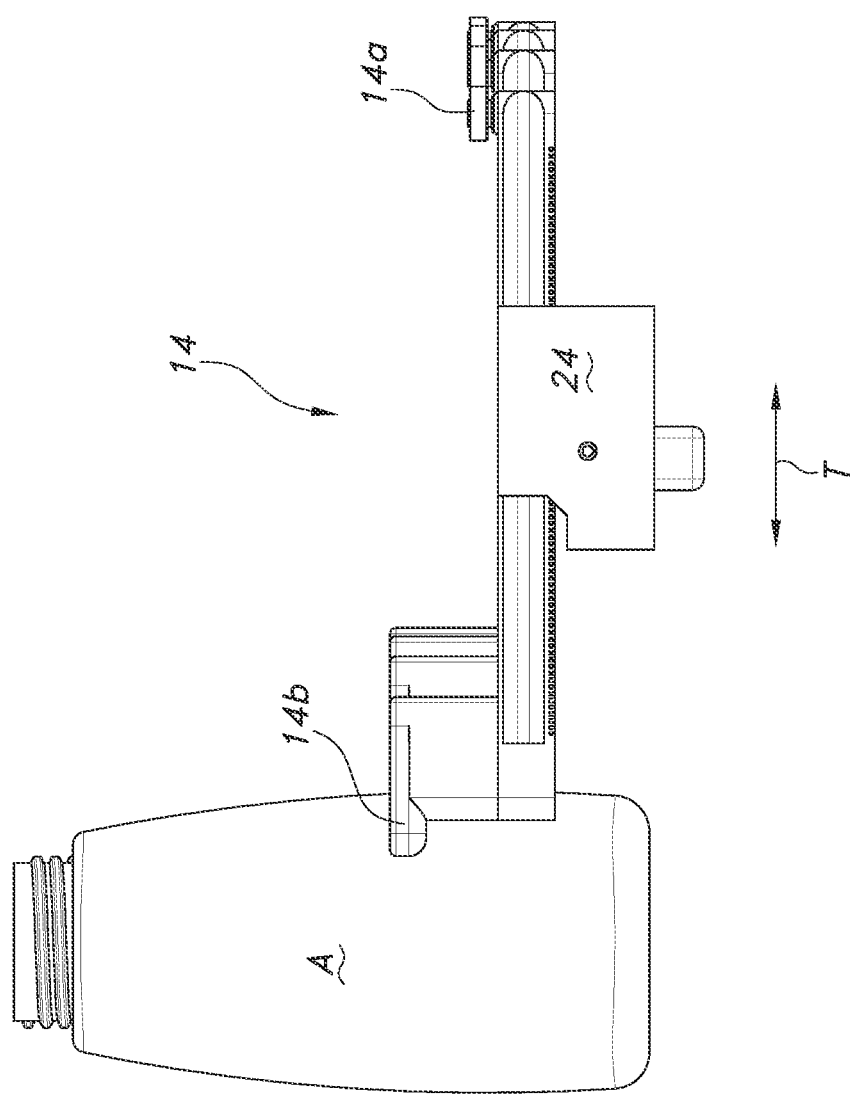
FIG. 2B is a side view showing the plurality of dynamically adjustable guides forming a contoured profile for guiding an article being conveyed.
Figure 2C:
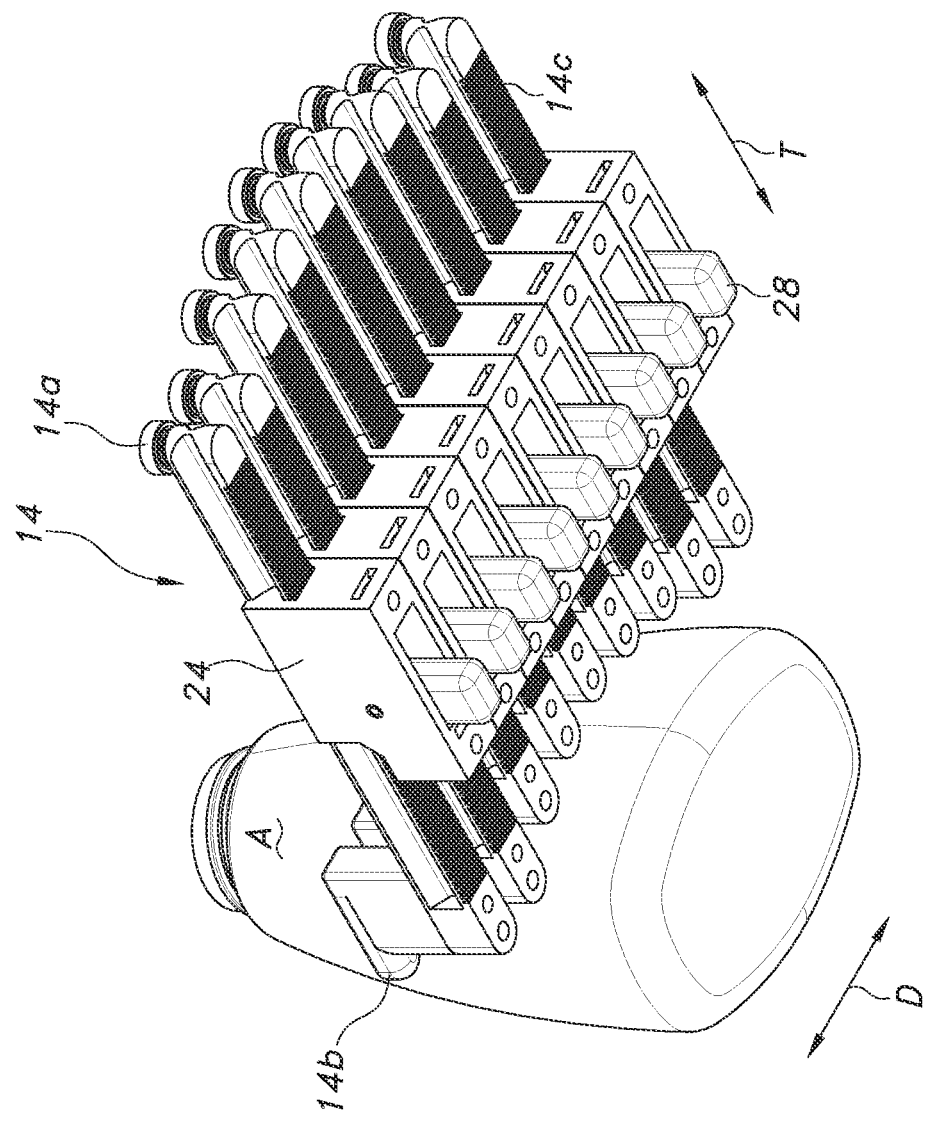
FIG. 2C is a bottom view showing the plurality of dynamically adjustable guides forming a contoured profile for guiding an article being conveyed.

As perhaps best understood from FIGS. 2-6, as well as from FIGS. 1, 1A, and 1B, the guides 14 may be selectively moved in the transverse direction T toward and away from an article A to be guided (such as one traveling along an associated conveyor, as outlined further in the following description). Referring back to FIGS. 1 and 1A, and as outlined further herein, actuation of the guides 14 for movement in this manner may be achieved using an actuator in the form of a movable cam 22. The cam 22 includes a camming surface 22a adapted to engage a cam follower 14a (static, as shown in FIGS. 1 and 2), or dynamic (wheel, as shown in FIGS. 2-6) at one end of each of the guides 14, which may be movably (e.g., slidably) mounted in corresponding support blocks 24 (either individually, as shown in FIGS. 2-6, or collectively, as shown in FIGS. 1 and 1A).

At the end of the forward run of the apparatus 10, a second actuator may engage the follower 14a of the actuated guide(s) 14 and returns the same to a retracted position. The second actuator may be, for example, a stationary cam 32 having a camming surface 32a, but could be dynamic as well. In any case, the retracted guides 14 may then traverse the endless loop and ultimately return to the forward run, ready for engagement with the first actuator, or cam 22, when actuation is desired, as discussed below in further detail.

Actuation of the first actuator, or cam 22, and hence movement of the selected guides 14 in position relative to each other in the transverse direction for achieving guidance may be based on the shape of the corresponding article A. For example, correspondence may be established with a perimetrical shape of the adjacent surface of the article (i.e., the actuation of the guides 14 to variable positions in the transverse direction and the contour thus achieved is based directly on the shape or contour of the adjacent article surface). The dimensions defining the shape and the degree or number of the guides actuated may include, for example, a width of the article in the conveying direction D, or a depth of the article in the transverse direction T. Article height or elevation as a dimension may also be considered, as outlined further in the description that follows and shown in FIG. 11.

Based on the article shape and pitch, the pattern or sequence of movement of the actuator (cam 22) may be pre-programmed into an associated controller R (see FIG. 1A) associated with a motive device, such as a linear actuator 23, to provide the actuation in the desired manner (that is, movement of the cam 22 to and fro in the transverse direction to actuate the plurality of guides based on the shape of the article). Consequently, a tip 14b of each of the guides 14 (which may be rounded or soft to avoid marring the article if engaged) may move toward and possibly into engagement with the article to provide positive control based directly on the article contour or shape. As illustrated, each guide may be positioned a slightly different amount in the transverse direction in the illustrated example to account for and match the profile of the article being conveyed (which is curved), but of course the article could take any shape. Indeed, if the adjacent article surface was planar, the guides 14 might be actuated substantially the same amount.

In any case, it can be understood that the precise relative positioning of each of the plurality of guides 14 ultimately depends on the nature of the article to be guided by the plurality of guides, preferably with positive control. Thus, the degree of actuation may be highly variable, including among conveying operations involving different types of articles. Still, the automated nature of the actuation sequence avoids the need for adjusting the position of a static guiderail with human intervention, as per the existing technology used for article guidance during conveyance.

As one example of a possible mode of actuation in an automated fashion, a common technique used in servo-mechanism and robotics is known as "electronic cam gearing." In this situation, an operator provides a position table to the controller for controlling (actuating or moving) the actuator (e.g., cam 22), which of course in turn moves the selected guides to achieve correspondence with the dimensions of a particular article or group of articles being conveyed. A scanner may be used to scan the article and create a software model (i.e., a pre-programmed profile), which may also include an indication of the established pitch of the articles being conveyed (as typically defined by an upstream process). A reference axis position (e.g., the conveyor position) and a slave or cam axis position table (e.g., the guide position) representing the cam axis position for each point of the reference position. The table is an interpolation commonly made with a plurality of points (e.g., 250). An encoder detects the instant position of the conveyor and sends it to the controller, which reads the table and moves the actuator (cam 22) to the programed position based on the conveyor position. However, this is simply one example provided for purposes of illustration, and other techniques could be used, including for example actuation for the articles based on real-time operator control.

Figure 3:
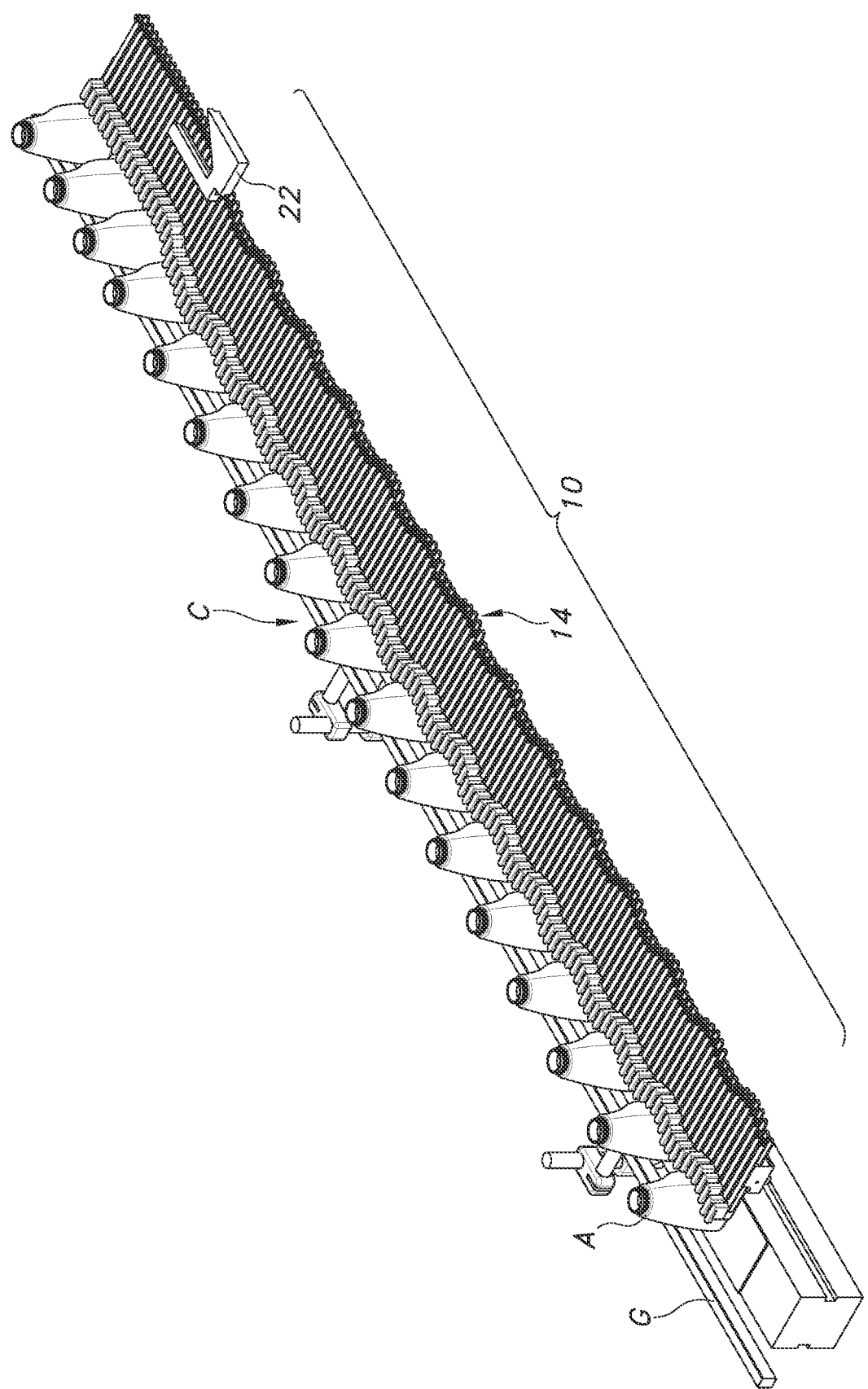
FIG. 3 is a perspective view a dynamically shaped guide apparatus according to another aspect of the disclosure in connection with an article conveyor.
Figure 4:
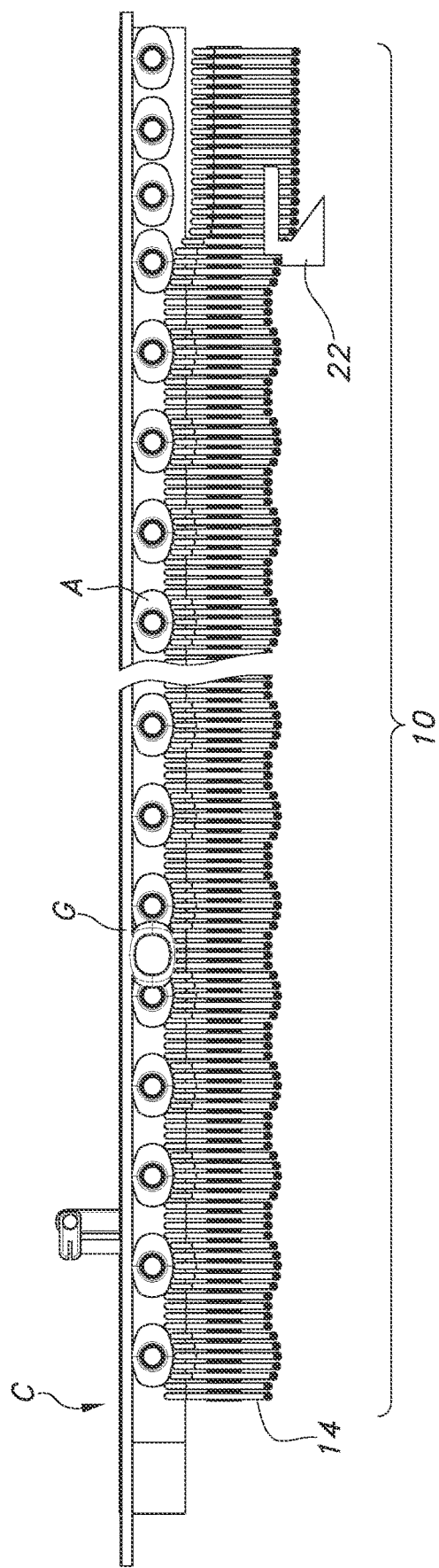
FIG. 4 is a top view a dynamically shaped guide apparatus according to another aspect of the disclosure in connection with an article conveyor.

As can be appreciated from FIGS. 3 and 4, the guide apparatus 10 and, in particular, the guides 14 may thus be selectively activated during conveyance to provide a guiding function to one or more articles on an adjacent conveyor C (which may be of the endless belt type, but could take any other form). As can be appreciated, the dynamic nature of the guide apparatus 10 allows for the guides 14 to be extended or deployed as necessary to guide or engage the articles A being conveyed based on one or more dimensions of the article, or the shape of it, with the tips 14b extended variably to form a contoured guide (note profile P shown in FIGS. 1A and 1B indicating the variable extension of the guides corresponding to the shape of an article being conveyed).

As may be further appreciated, the guide apparatus 10 as shown in the foregoing depictions may be arranged to provide guiding function and lateral support along at least one side of the articles A (but may be on both sides, as discussed below and shown in FIG. 14), which may be guided along a second, opposite side by a conventional static guide rail G. Consequently, the apparatus 10 can readily accommodate articles of different dimensions (shapes and sizes), without the need for the mechanical adjustment or human intervention associated with a conventional static guide rail.

To ensure positive control is achieved during conveyance of the article(s) A, the apparatus 10 may be adapted to selectively fix the position of each guide 14 depending on the desired position when actuated. With reference to FIGS. 2C, 5, 5A, and 5B, this may be achieved using a lock, which as an example may be of the ratchet and pawl type, but could take any form that serves to fix the position of the guide 14 relative to the support (e.g., block 24). Specifically, a carrier 26 for supporting at least one of the guides 14 may include a pivotally mounted pawl 28 for engaging one of a plurality of teeth 14c on the underside of the guide in a normal or home position. As can be appreciated, this maintains the guide 14 in a locked position.

In order to allow for movement of the guide(s) 14 when desired (such as by the above-described camming action), the pawl 28 may be pivoted (note pivot point V) to a release or unlocked position (pawl 28' in FIGS. 6, 6A, and 6B). With reference to FIG. 6, this may be achieved by an actuator in the form of a cam, such as a static block 30 having a sloped camming surface extending in the conveying direction D for engaging a depending portion of the pawl 28 during conveyance. This engagement may overcome a retaining force, which may be provided by a magnetic coupling (note magnets 34a, 34b), but a biasing mechanism, such as a spring (not shown), could also be used to maintain the pawl 28 in a position to lock the associated guide 14, and then release as desired to permit reciprocal transverse movement (note arrow B) based on the article shape/dimension(s)).

As can be appreciated, the camming action achieved thus pivots the pawl 28 as shown, releasing it from the engagement with one of the teeth 14c, thereby allowing for movement of the guide 14 in the transverse direction. The cam or block 30 may then allow the pawl 28 to return to the engaged position to lock the guide 14 in place once moved to the desired (advanced) position based on the corresponding shape or dimension of the article A. In similar fashion, the pawl 28 may be again released at one end portion of the forward run, which allows for the cam 32 (FIGS. 1, 1B, and 8; note also conveyor chain 16) having a camming surface 32a to engage the follower 14a of the actuated guide(s) 14 and return the guides to a retracted position. The guides 14 may then traverse the endless loop and ultimately return to the forward run, ready for engagement with the cam 22 if actuation is desired.

FIGS. 5 and 6 also illustrate that each guide 14 and associated block 24 may be connected to a link 16a adapted to form an interdigitated relationship with links in tandem to form a conveyor chain 16 of the guide apparatus 10.

FIGS. 9 and 10 illustrate one possible environment of use of the guide apparatus 10 in connection with an endless conveyor C for conveying articles A. The guide apparatus 10 may be positioned on either side of the conveyor C, with the opposite side adjacent to the articles including a conventional static guide rail G, as previously noted. Both the guide apparatus 10 and conveyor C may include suitable stands 36 for being supported above the ground. The guide apparatus 10 may also incorporate the conveyor C as a single conveying unit. These figures also illustrate the actuator 23 for actuating the cam 22, which actuator may be of the linear type, controlled by a suitable controller, such as for example a PLC or a Programmable Motion Controller, as previously noted.

Various modifications are possible in view of the above teachings. For example, it can be appreciated from FIG. 11 that a modified version of the apparatus 100 may include multiple levels of guides 114a, 114b at different elevations (upper U and lower L). Thus, when actuated dynamically, as noted, the guides 114a, 114b of the different levels may both engage the corresponding article A at different elevations. This helps to provide positive engagement and guidance (control), and may be especially helpful in situations where the articles are relatively tall or top-heavy, tending to deleteriously tip over if not positively controlled during conveyance. The modes of actuation, locking, and retraction may be as previously described. An actuator may also be provided for adjusting the relative height or elevation of the guides 114a, 114b (relative to each other or the corresponding conveying surface of the article conveyor, not shown in FIG. 11) to accommodate articles of varying heights, which adjustment may be done automatically based on a height of the articles (which may be sensed using a suitable sensor, such as a proximity sensor).

FIGS. 12 and 13 further illustrate that the guide apparatus 10 may be vertically adjustable. For example, vertical adjustment may be achieved using an actuator 40 supported by the stand 36, and connected to a support 42 for supporting the conveyor (such as, for example, via a guiderail). The actuator 40 may thus be used to raise or lower the guides 14 to achieve the desired elevation for establishing positive control for engaging and guiding articles. The stand 36 may also include guides 36a, 36b for slidably engaging connectors 44 connected to the support 42 to lend stability to the arrangement.

FIG. 14 shows that a further version of the apparatus 200 may include dynamically shaped and moveable (conveyed) guides 214, 216 for engaging different or opposing sides of the articles A conveyed on a conveyor C. Again, the actuation may be as previously described (note actuators 218, 220), and need not be repeated here.

While the above conveyors are shown as being linear, it should be appreciated that the guide apparatus could be used with other forms of conveyor. For example, FIG. 15 illustrates a circular or round conveyor 300 (termed a "star wheel," such as for a filling or capping machine for bottles), with actuation of the guides 314 being radially outward to engage the articles A (but the movement could also be actuated radially inwardly).

The foregoing descriptions of various embodiments of a dynamically shaped guide apparatus and related methods provide illustration of the inventive concepts. The descriptions are not intended to be exhaustive or to limit the disclosed invention to the precise form disclosed. Modifications or variations are also possible in light of the above teachings. For example, the controller used for the actuator(s) may include a pre-programmed menu of "recipes" for known products, and may include a touch screen or the like to allow for ready implementation by an end user. As is self-evident, the width of the guides 14 in the conveying direction may also be adjusted from what is shown as necessary or desired for a particular implementation (with thinner guides potentially allowing for greater guiding function or positive control via contact with the article being conveyed).

Any elements described herein as singular can be pluralized (i.e., anything described as "one" can be more than one), and plural elements can be used individually. Characteristics disclosed of a single variation of an element, the device, the methods, or combinations thereof can be used or apply for other variations, for example, dimensions, shapes, materials, or combinations thereof. The terms "substantially," "about," or "approximately" are meant to mean as close to the corresponding condition as reasonably possible, and typically not varying from it by more than 10%, unless circumstances indicate otherwise. Any species element of a genus element can have the characteristics or elements of any other species element of that genus. The term "comprising" is not meant to be limiting. The above-described configurations, elements or complete assemblies and methods and their elements for carrying out the invention, and variations of aspects of the invention can be combined and modified with each other in any combination.

The invention claimed is:

1. An apparatus for guiding at least one article traveling along a conveyor in a conveying direction, the at least one article having a shape, comprising:
   a plurality of guides for guiding the at least one article, the plurality of guides being dynamically adjustable in a direction transverse to the conveying direction; and
   at least one actuator for adjusting a relative position of the plurality of guides based on the shape of the at least one article,
   wherein the at least one actuator is adapted to move in the transverse direction,
   wherein the at least one actuator comprises a cam surface and each of the plurality of guides comprises a cam follower for engaging the camming surface.

2. The apparatus of claim 1, wherein the cam follower comprises a roller.

3. The apparatus of claim 1, wherein each of the plurality of guides comprises a tip for engaging the at least one article.

4. The apparatus of claim 1, wherein each of the plurality of guides includes a lock adapted for locking the guide at a deployed position relative to the at least one article, and for unlocking to allow the guide to move to a retracted position relative to the at least one article.

5. The apparatus of claim 3, further including a second actuator for returning the plurality of guides to the retracted position.

6. The apparatus of claim 1, further including a controller for controlling movement of the at least one actuator based on a pre-programmed profile corresponding to the shape of the at least one article.

7. The apparatus of claim 1, wherein the at least one article is a plurality of articles, and further including a controller for controlling movement of the at least one actuator based on a pre-programmed profile corresponding to a shape of each of the plurality of articles.

8. The apparatus of claim 1, wherein the plurality of guides comprise first guides along one side of the at least one article, the at least one actuator comprises a first actuator, and further including a plurality of second guides opposing the plurality of first guides, each being dynamically adjustable in a direction transverse to the conveying direction; and at least one second actuator for adjusting a relative position of the plurality of second guides in the transverse direction based on the shape of the at least one article.

9. The apparatus of claim 1, wherein the plurality of guides comprise first guides having a first elevation relative to the conveyor, and further including a plurality of second guides dynamically adjustable in the transverse direction, the plurality of second guides having a second elevation relative to the conveyor.

10. The apparatus of claim 9, wherein the first elevation or second elevation is adjustable.

11. The apparatus of claim 1, further including a conveyor for conveying the plurality of guides relative to the article conveyor.

12. An apparatus for guiding at least one article having a shape, comprising:
  a conveyor including a conveying surface for engaging and conveying the at least one article in a conveying direction;
  a plurality of guides for guiding the at least one article while traveling along the conveying surface, the plurality of guides being dynamically adjustable in a direction transverse to the conveying direction; and
  at least one actuator for adjusting a relative position of the plurality of guides based on the shape of the at least one article.

13. The apparatus of claim 12, wherein the at least one actuator is adapted to move in the transverse direction.

14. The apparatus of claim 13, wherein the at least one actuator comprises a cam surface and each of the plurality of guides comprises a cam follower for engaging the camming surface.

15. The apparatus of claim 14, wherein the cam follower comprises a roller.

16. The apparatus of claim 12, wherein each of the plurality of guides comprises a tip for engaging the at least one article.

17. The apparatus of claim 12, wherein each of the plurality guides includes a lock adapted for locking the guide at a deployed position relative to the at least one article, and unlocking for allowing the guide to move to a retracted position relative to the at least one article.

18. The apparatus of claim 17, further including a second actuator for returning each of the plurality of guides to the retracted position.

19. The apparatus of claim 12, further including a controller for controlling movement of the at least one actuator based on a pre-programmed profile corresponding to the shape of the at least one article.

20. The apparatus of claim 12, wherein the at least one article is a plurality of articles, and further including a controller for controlling movement of the at least one actuator based on a pre-programmed profile corresponding to a shape of each of the plurality of articles.

21. The apparatus of claim 12, wherein the plurality of guides comprise first guides along one side of the at least one article, the at least one actuator comprises a first actuator, and further including a plurality of second guides opposing the plurality of first guides, each being dynamically adjustable in the transverse direction; and
  at least one second actuator for adjusting a relative position of the plurality of second guides based on the shape of the at least one article.

22. The apparatus of claim 12, wherein the plurality of guides comprise first guides having a first elevation relative to the conveyor, and further including a plurality of second guides being dynamically adjustable in the transverse direction, the plurality of second guides having a second elevation relative to the article conveyor.

23. The apparatus of claim 22, wherein the first elevation or second elevation is adjustable.

24. The apparatus of claim 12, wherein the conveyor comprises a star wheel.

25. A method for guiding at least one article being conveyed in a conveying direction, the at least one article having a shape, comprising:
  guiding the at least one article being conveyed by dynamically adjusting a relative position of a plurality of guides traveling in the conveying direction, the adjusting being in a direction transverse to the conveying direction based on the shape of the at least one article.

26. The method of claim 25, wherein the adjusting step comprises moving the plurality of guides in the transverse direction different amounts to create a profile corresponding to an adjacent perimetrical surface of the at least one article.

27. The method of claim 26, the adjusting step comprises raising or lowering the plurality of guides.

28. The method of claim 26, the raising or lowering step comprises changing the elevation of a first set of guides of the plurality of guides relative to a second set of guides.

29. An apparatus for guiding at least one article traveling along a conveyor in a conveying direction, the at least one article having a shape, comprising:
  a plurality of guides for guiding the at least one article, the plurality of guides being dynamically adjustable in a direction transverse to the conveying direction; and
  at least one actuator for adjusting a relative position of the plurality of guides based on the shape of the at least one article;
  wherein each of the plurality of guides includes a lock adapted for locking the guide at a deployed position relative to the at least one article, and for unlocking to allow the guide to move to a retracted position.

30. The apparatus of claim 29, further including a second actuator for returning the plurality of guides to the retracted position.

31. An apparatus for guiding at least one article traveling along a conveyor in a conveying direction, the at least one article having a shape, comprising:
  a plurality of guides for guiding the at least one article, the plurality of guides being dynamically adjustable in a direction transverse to the conveying direction; and
  at least one actuator for adjusting a relative position of the plurality of guides based on the shape of the at least one article;
  wherein the plurality of guides comprise first guides having a first elevation relative to the conveyor, and further including a plurality of second guides dynamically adjustable in the transverse direction, the plurality of second guides having a second elevation relative to the conveyor.

32. The apparatus of claim 31, wherein the first elevation or second elevation is adjustable.

33. An apparatus for guiding at least one article traveling along an article conveyor in a conveying direction, the at least one article having a shape, comprising:
  a plurality of guides for guiding the at least one article, the plurality of guides being dynamically adjustable in a direction transverse to the conveying direction;

at least one actuator for adjusting a relative position of the plurality of guides based on the shape of the at least one article; and a guide conveyor for conveying the plurality of guides relative to the article conveyor.

* * * * *